United States Patent [19]

Murphy

[11] 4,059,760
[45] Nov. 22, 1977

[54] GEORADIOLOGICAL SURVEYING FOR OIL AND GAS AND SUBSURFACE STRUCTURE CONTOUR MAPPING

[76] Inventor: John A. Murphy, 920 E. 36th Place, Tulsa, Okla. 74105

[21] Appl. No.: 702,607

[22] Filed: July 6, 1976

Related U.S. Application Data

[63] Continuation-in-part of Ser. No. 525,002, Nov. 18, 1974, abandoned.

[51] Int. Cl.² ............................................. G01V 5/00
[52] U.S. Cl. ................................. 250/253; 250/252
[58] Field of Search ........................................ 250/253

[56] References Cited

U.S. PATENT DOCUMENTS

| | | | |
|---|---|---|---|
| 2,526,326 | 10/1950 | Callahan et al. | 250/253 |
| 2,535,066 | 12/1950 | Herzog | 250/253 |
| 2,562,969 | 8/1951 | Teichmann | 250/253 |
| 2,775,710 | 12/1956 | Ludeman | 250/253 |
| 3,609,363 | 9/1971 | Milly | 250/253 |

Primary Examiner—Harold A. Dixon
Attorney, Agent, or Firm—Victor J. Evans & Co.

[57] ABSTRACT

A prospecting system for hydrocarbons using emanoradiation measurements of the neutron, beta, gamma rays, and radon gas emitted at the earth surface and atmosphere from the earth basement complex and, the overlying sedimentary deposits of carbonaceous rocks, shales and sandstone that are impregnated with uranium, thorium and potassium derived from the eroded earth basement complex materials. A number of check points are measured and the radiation levels are plotted to form a georadiograph. A comparison between the background level and the check point levels is used in determining the contour data basically of the earth's stratosphere, altered in its variation by hydrocarbons, radiation active substances, and/or mineral deposits.

2 Claims, 10 Drawing Figures

U.S. Patent    Nov. 22, 1977    Sheet 1 of 4    4,059,760
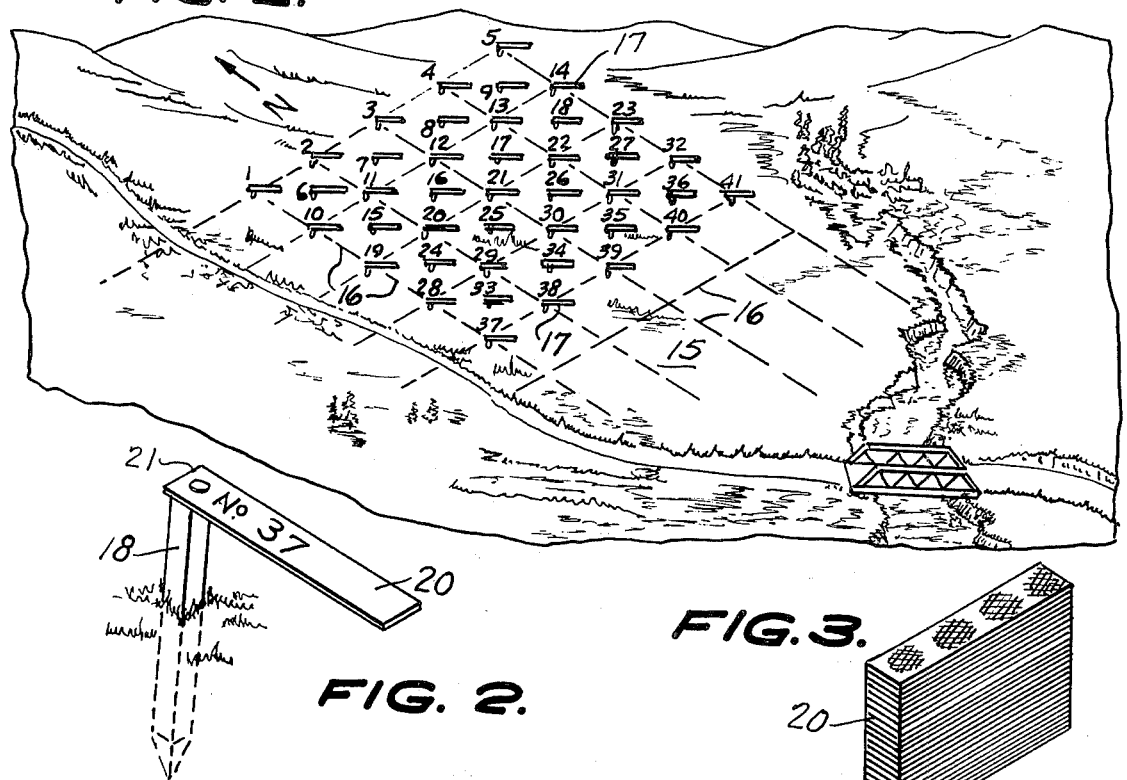
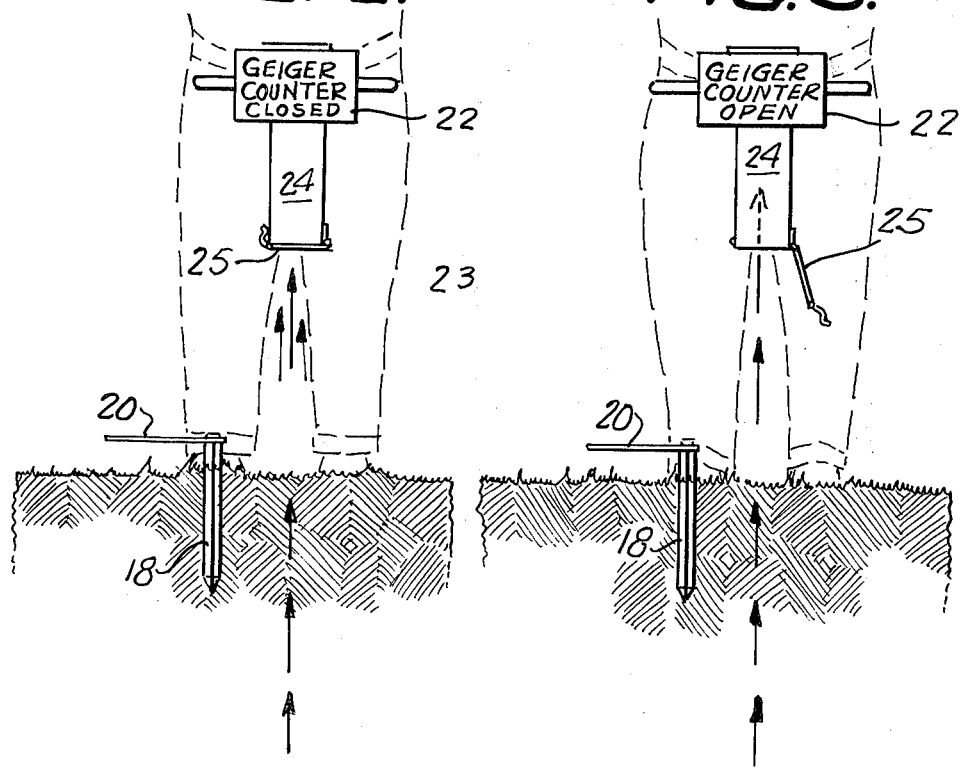

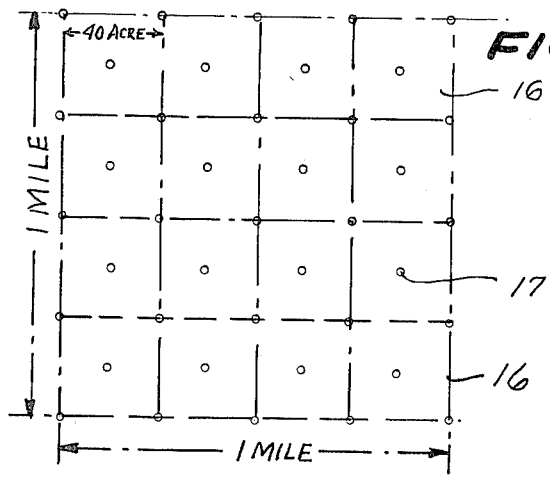
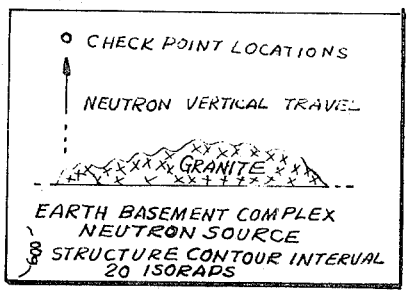
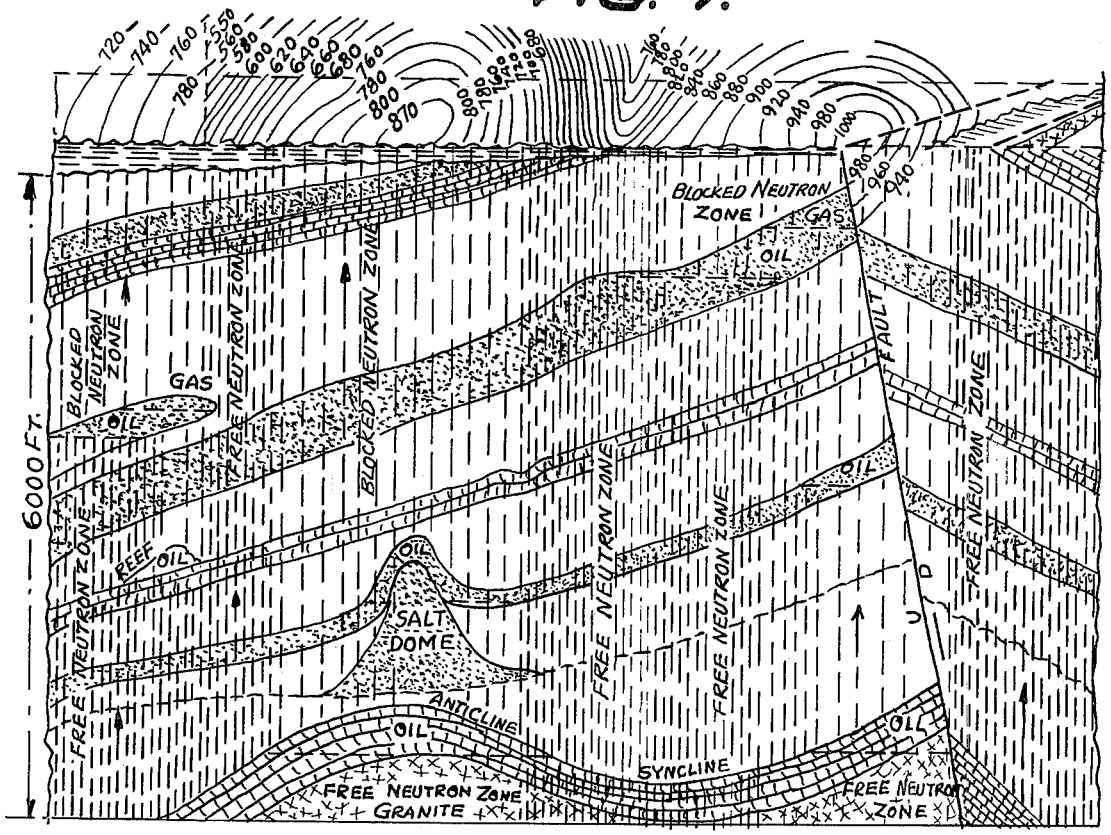

FIG. 10.

```
STATE _____ COUNTY _____
WEATHER _____ OBSERVER _____
INTERVAL _____ MINUTE. PERIOD ____ _____
DATE _____, 19____ TIME ____ A.M.___ P.M.___
LOCATION _____
_____
```

| NO. | | | | | TOTAL | AVERAGE | GEOLOGY |
|---|---|---|---|---|---|---|---|
| M/H | | | | | | | |
| B.G. | | | | | | | |
| DIF. | | | | | | | |
| % | | | | | | | |
| NO. | | | | | | | |
| M/H | | | | | | | |
| B.G. | | | | | | | |
| DIF. | | | | | | | |
| % | | | | | | | |
| NO. | | | | | | | |
| M/H | | | | | | | |
| B.G. | | | | | | | |
| DIF. | | | | | | | |
| % | | | | | | | |
| NO. | | | | | | | |
| M/H | | | | | | | |
| B.G. | | | | | | | |
| DIF. | | | | | | | |
| % | | | | | | | |

GEORADIOLOGICAL SURVEYING FOR OIL AND GAS AND SUBSURFACE STRUCTURE CONTOUR MAPPING

CROSS REFERENCE TO RELATED APPLICATION

This application is a continuation-in-part of my copending application Ser. No. 525,002, filed Nov. 18, 1974 entitled PROSPECTING SYSTEM USING GEORADIATION TECHNIQUES, and now abandoned.

BACKGROUND OF THE INVENTION

Field of the Invention

The present invention relates to the detection, logging and charting of atomic radiation of the earth, on or near its surface over a specific period of time that has been established as of the minimum order of time constants to permit the accurate and continuous dependable mapping of its subsurface structural features, and/or subsurface structure contour characteristic alterations brought about as the result of thermalization, or blocking of the neutron, particularly due to hydrocarbon and/or brine concentrations in porous media of the earth sediments beneath the land surface.

The instant invention refers to the detecting, logging and charting of both the beta and gamma rays emitted from the earth basement complex, and the radioactive elements incorporated in all earth sedimentary deposits from the earth complex up to the earth surface.

The primary object of this invention is to provide the method and the means of using the earth radiation from the earth basement complex and radiation of the radioactive elements in earth sedimentary formation members to bring into being a geological survey method in the search for oil and gas, by proven values of the blocking and thermalizing effects of the hydrogen atom upon the neutron, and the receiving and logging of all beta and gamma rays and radon gas attendant to such neutron activities.

SUMMARY OF THE INVENTION

The instant equipment and materials used in topographical data gathering consist of the following: a plane table, a plane table tripod, a plane table paper data sheet, a geologist's foldable surveying rod, white cloth strips 2 by 30 inches in width and length (preferably weatherproof), U.S. soil conservation maps, preferably 8 or 10 inches scale, U.S. topographic maps, geiger Mueller counter (170B professional, or equivalent), 8 power binocular field glass, lightweight, collapsible canvas bottom stool, specially designed georadiological log book and field type calculators.

Other objects and advantages will become apparent in the following specification when considered in light of the attached drawings.

BRIEF DESCRIPTION OF THE DRAWINGS

FIG. 1 is a map showing an area to be surveyed, and having the numbered check points shown;

FIG. 2 is an enlarged view of one of the check point numbered tabs;

FIG. 3 shows a stack of the numbering tabs illustrating their size and measurement;

FIG. 4 shows a geiger counter in place for reading background radiation and having a lens cover secured over the opening;

FIG. 5 shows the geiger counter in place to read radiation through the earth, and having the lens opening uncovered;

FIG. 6 shows a typical plot to be surveyed with the area carefully measured into equal squares and having the best check points marked;

FIG. 7 is an elevational view taken through the various strata of the earth and showing typical deposits of oil, gas and faults in the strata line;

FIG. 8 is a miniature view of a section through the earth's surface showing neutron travel toward the surface and the location of a granite deposit;

FIG. 10 is a typical page taken from a radiation book.

DESCRIPTION OF THE PREFERRED EMBODIMENT

Figure 9:
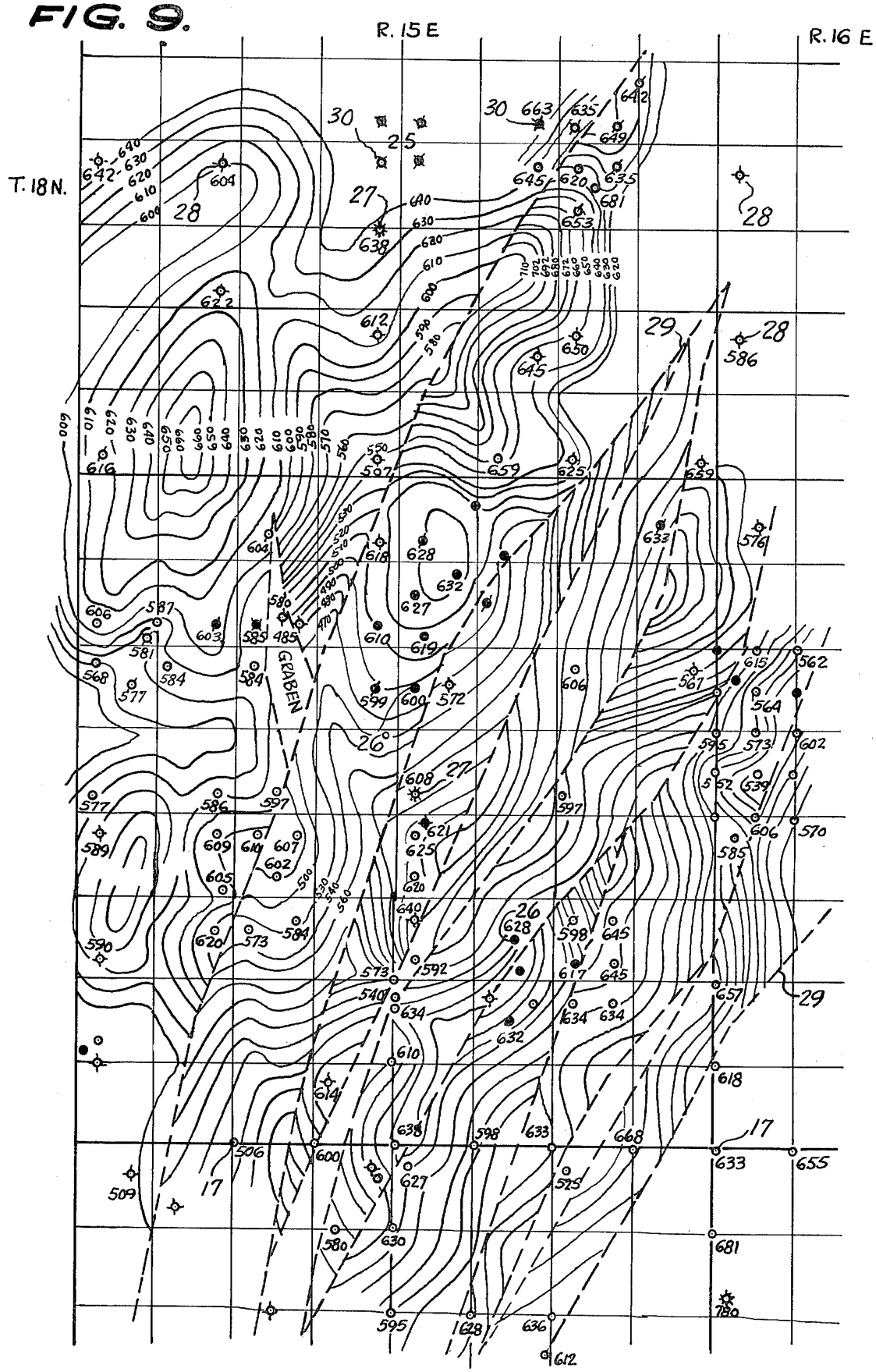
FIG. 9 is a typical georadiograph map showing contours contour symbols, faults and so forth, as in all geological subsurface maps, but also including actual measurements of the varying quantity of received neutrons, beta, gamma rays and radon gas.

The present invention relates to, embodies and embraces the use of conventional geological surveying instruments, since the engineering methods of establishing geographical locations and station elevations above sea level of the georadiograph stations are identical and function in the identical manner and for the same purposes as in the field of acquiring contour datum of both geological surface datem for contouring the surface geological structural phenomena and for establishing subsurface Datum points for geological or engineering contouring of subsurface mapping or geological subsurface mapping.

However, the datum acquired in both surface and subsurface media is based upon the use of topographic, or tops, of certain specified earth sedimentary members of specified formation of known geological age. This type of geological or engineering mapping is finite in only producing geophysical phenomena of certain specified datum points with no positive or direct relationship relative to the positive location and delineation of oil or gas accumulative deposits beneath the earth surface.

In contrast to conventional geological or engineering mapping of certain geological horizons of specified earth stratum, the datum acquisition resulting from receiving, logging and charting of all the beta and gamma rays being produced from the earth basement complex, and radioactive elements inherent in all earth sedimentaries from the earth basement complex up to the earth surface being based upon definite minimum time periods of reception, logging and plotting of variations of reception of these beta and gamma rays and radon gas due to the blocking thermalization of the neutron by hydrogen and hydrogen association as a corporate part of or associated with earth sedimentaries.

There are three primary factors involved in the blocking, absorption or thermalization of the neutron, and the reception of radiation from the earth bearing concentrations of highly radioactive agents. They are, (1) the inevitable variation of the depth of earth basement complex materials from the earth surface. (2) The invariable variations in the thickness of earth sedimentary strata resulting in variations of incorporation of radioactive elements in each respective member from the earth basement complex to the land surface. (3) The all-important concentration of hydrocarbons, oil and gas, in porous or highly crystalline sedimentary members or formations of earth strata. Since hydrocarbons, oil, gas and parafin are the principal natural sources of hydrogen, normally concentrated in porous or highly crystalline rock beneath the earth surface, it follows that oil or gas accumulations in earth strata, in any concentration, will bring about proportional blocking, thermalization or absorbing of the neutron associated within and passing through such media.

Beta and gamma ray and radon gas reception at the search surface are coexistent, and are inseparably associated with neutron activity throughout subsurface radiation. Since neutron activity and its consequent effects upon the beta and gamma ray activities are alternately activated, it follows that radiation received at the earth surface must allow for the slowing down of such activities. Slowing down and indeterminate reception of the gamma and/or beta rays at the earth surface is in the order of uncertainty of continuous reception that reception and monitoring for datum values at high speed reception calibrated in seconds of only the gamma ray particularly, prohibits the possibility of accurate and dependable datum for geological structure contouring. This particularly applies to the use of scintillometer reception of gamma rays at high altitudes and at high speeds. Such gamma ray reception and monitoring produces wide and "high peaks" and values over miles of terrain and so-called "halo" patterns bordering oil and gas reservoirs beneath the searth surface. Film recording at high speeds and altitudes based on average travelling in time constants of seconds registers only the type of datum production which results in the manner cited above.

Surface geological surveys based only on gamma ray determinations of sedimentary strata furnish only data of arial locations and delineations of same. Such methods do not present the possibility of geological structure contouring of such formations—that is accomplished by the georadiograph method. This type of "gamma ray tracing" does not recognize the basic factors of radiation involvement beneath these same "key beds" of limestone, shale and sandstone. Thus, the difference between "geological surface mapping" and geological surface structural contour mapping.

Referring now to the drawings in detail, wherein like reference characters indicate like parts throughout the several figures, the reference numeral 15 indicates generally an area which is to be surveyed, the area then being subdivided into equal smaller squares 16 which may be in the order of a quarter acre each. At the corners of each of the smaller squares 16 there is located an identifying check point number 17, these check point numbers 17 being used to accurately identify where radiation measurements are being taken. It should be noted here that there is also a check point number located at the center of each of these small squares 16.

In the enlarged view of FIG. 2 there can be seen that the check point markers comprise a wooden post 18 which is driven into the ground, the post holding a rectangular wooden board 20 by means of a mounting brad 21 to the post, the rectangular board 20 being clearly marked with an identifying number.

When measurements are to be made as to the amount of radiation, a geiger counter 22 is stationed near one of the check point markers 17 and stood on its tripod legs 23 or held free by an operator so that its measuring tube 24 is pointed downwardly toward the earth. The first reading taken is one for background radiation and as shown in FIG. 4 the cover 25 over receiving tube 24 is fastened shut so as to prevent any direct radiation into the sensitive measuring portion of the counter. After the maximum incoming radiation scintillations have been recorded, the measuring procedure is then repeated but this time with cover 25 open so that any radiation will pass directly into receiving tube 24 (FIG. 5).

It has been found that an area under surveillance can be measured far more accurately if this area is divided into a plurality of smaller squares. In FIG. 6, for example, a 1-mile square area is divided into a plurality of small 40-acre squares and by using check points in each of the four corners of the little squares and at a center point a much more accurate reading can be obtained.

The georadiograph surveyor records all radiation data obtained at each of these plurality of check points and from this data accurate contouring is done, resulting in accurate geological subsurface structural determinations. In addition thereto, positive and accurate detailed mapping of buried oil and/or gas reservoirs are obtained regardless of the depth, type or their respective geological structural positions. In areas where the topography, and/or vegetation prohibits such ideal grid pattern the georadiograph surveyor places the check points at advantageous locations on the field survey map in such a manner that the resulting recorded data will permit accurate and finite determinations. In FIG. 7 there is a typical contouring map as would be constructed from measurements and is indicative of the various strata as would be found in a vertical section through the earth. Sections A through G as shown at the bottom of the elevation section will be described in detail as showing various characteristic areas through the earth's surface. The neutron travel arrow indicates the positive vertical direction of travel of the neutron constantly emitted from the earth basement complex materials, such as granite, gabro and dibro, possibly of a molten or viscous material.

Column A depicts, by arrows, the upward traveling neutron passing through sediments, or formations, of the earth lain down over the earth basement complex, the source of these neutrons. These sedimentary formations consist of alternate beds of dolomite, limestone, shale, sandstone and conglomerates. These formations become oil and/or gas reservoir under certain porous and structural conditions. Column A indicates a "reef" type deposit of porous or crystalline limestone deposited in such a manner as to present the type of topographic feature of a true "structural dome", thus offering reservoir possibilities. This type reservoir rarely obtains at the "crest" of a structural anomaly, but usually obtains "down dip" of structural features, or, down dip of normal or "regional dip" areas. This type feature usually embraces relatively small areas but form locally important oil and/or gas reservoirs. This type feature is never evidenced at the overlying land surface, or usually overlooked, and embracing a small limited area rarely indicated by geophysical mapping of the general area where they exist. Should this reef be saturated with hydrocarbon the georadiograph will accurately locate and delineate its presence.

Column A also indicates the presence of a "pinch out" sandstone reservoir that is "structurally low". This type reservoir is never evidenced at the surface, and is rarely determined and defined by geophysical surveys although this type reservoir is responsible for the largest and most prolific oil and gas reservoirs. They are in fact the largest "pinch out" types of reservoirs, are never evidenced at the earth's surface permitting surface geological surveying and rarely evidenced by geophysical surveys. This type reservoir never crests any anticline and usually are structurally down dip, and can never be accurately mapped by prior art methods. The georadiograph survey invariably and accurately locates and delineates this type of reservoir when saturated with hydrocarbon.

Column B This column indicates an area totally devoid of abnormal capture or blocking of the neutron and radon gas by hydrocarbons, thereby placing this area in the negative classification. Again, surface or geophysical geological surveys may or may not accurately locate and/or delineate such areas. The georadiograph accurately locates and delineates such areas.

Column C displays the cross section of a typical anticline, and a "salt dome" type of structurally positioned oil and gas reservoir possibilities. These two type features may or may not be evidenced at the earth's surface. Geophysical methods generally will map the structurally prominent, but may or may not accurately detail the location and/or delineation of hydrocarbon reservoirs present in such features. The georadiograph, however, accurately locates and delineates the hydrocarbon area of such features.

Column D. Again, the georadiograph accurately locates and delineates the area devoid of hydrocarbon reservoir and accurately maps true structural conditions of such areas.

Columns E and F These columns depict a "fault type" structural condition embodying and embracing upper oil and gas sand reservoirs situated at the apex or high side of the fault, and a deeper sand reservoir, and further, a deeper buried limestone reservoir, both apparently located on the down dip or low side of the fault. The important hade side of this fault is extremely difficult to map accurately using conventional surface, subsurface and/or geophysical methods, placing the operator in an uncertain position regarding the location and actual delineation of the buried oil and/or gas reservoir. The georadiograph accurately locates and delineates the entire reservoir and in addition thereto accurately and precisely locates and delineates the structural detail of the fault and the adjacent area.

Column G. Here again this column is like Columns B and D in that it is a barren zone area wherein neutrons travel from the basement area up through the earth without any blocking or absorption until it reaches the surface.

As presented, the contour display, immediately above the buried strata outlined in the cross section of FIG. 7, herewith, clearly indicates the efficacy of constant, accurate and precise determinations of locating geographically buried, or subsurface structural earth conditions and/or the precise, accurate locations and delineations of any and all hydrocarbon reservoir members present.

As a summary then of the information shown on FIG. 7 the unique, novel, new and useful values attributed to the use of radiation laws governing the radioactive neutron and attendant radiation emanating from the earth's interior beneath the overburdened stratified members of the sandy materials, traveling always vertically from the earth's interior, through sedimentary deposits to the earth's surface, brings into practical use the inherent value of the ratio of the slowing down, absorbing, and/or blocking effect of the elements common in all earth strata overlying the earth's basement complex. The most effective elements present in sedimentary strata in blocking the neutron and attendant radiation in passing into such strata are hydrogen 100 and carbon 15 which equates into a 115.8 effect, with the singular exception of lead which is extremely rare. Brines, or salt water, commonly present in sedimentary strata, offer the maximum of 37.8 in blocking, absorption, and/or slowing down of the neutron. Thus, it is clear that hydrocarbons which equate 115.8 as against brines of 37.8 are far more effective in blocking the passage of neutrons and attendant beta, gamma rays, and radon gas through this area.

The inevitable variations in the thicknesses of the earth's strata naturally and inevitably result in the variation of the reception of the neutron and attendant radiation at the earth's surface even though there are no hydrocarbons in the buried strata. It is important therefore that the radiation levels from the buried subsurface structural conditions of the earth be indexed and mapped accurately using georadiograph surveying techniques and methods.

Turning now to FIG. 9, there is shown a contour display drawn from received radiation measurements over a typical area of land. A study of the display will show that there is indicated thereon active oil wells 26, gas wells 27, dry holes 28, faults 29 and abandoned oil wells 30. The check points where measurements have been taken are indicated as at 17.

Since it is important to record all pertinent data relating to the reception of all radiation received at all check points, recording also the check points number of each and all such check points exactly as recorded on both the original base and reference map and any field maps in use, a sample page from such a radiation log is shown in FIG. 10. There is shown blocks for recording each check point number, the background radiation count per minute, the immediate recording of the ground count or M/H, as received by the geiger counter, and a sea level indication of each point and other pertinent data.

Sea level elevations are established at all stations to be surveyed.

"Closed" radiation detector receiving tubes, positioned several feet from the earth surface register the radiation received from the earth.

A time "constant" of a period of a minimum of four consecutive count minutes, are recorded in the "Survey Log Book" prepared for this data placement of this received radiation.

Immediately upon completing this "closed tube" operation the operator thoroughly cleans the ground surface immediately below the "closed tube" operation, and proceeds as follows: to wit Opening the "sleeve" of the radiation detector tube, the operator places the "open side" of the detector tube in immediate contact with the cleaned area of the ground; then proceeds immediately to receive the "Ground Count" for precisely the same time, or constant, as indicated in the "closed tube" operation.

This "Ground Count" data is immediately recorded in the survey log book, in its proper place, as indicated in the prepared log book.

Turning now to the use and operation of the invention comprising a prospecting system for hydrocarbons using georadiation techniques an area of land 15 which is to be surveyed is marked off on an area photographic map setting up the boundaries which are to be included in the survey. The area 15 is then further divided into a plurality of equal smaller squares with sides 16 and each of the squares is identified with an appropriate check point marker 20. Next, a geiger counter is placed adjacent to one of the check point markers and a count of background radiation is noted passing up through the earth's strata and arriving at or very near the particular check point in test. In this first reading the receiving tube 24 of geiger counter 22 is closed by means of the lid 25 and the radiation level noted is recorded on a sheet in the radiation log book as shown in FIG. 10. Now another reading is taken for a ground count and this time the geiger counter 22 has its receiving tube 24 open with the lid 25 hanging free so that there is recorded a direct ground count of the radiation passing up through the earth. This second reading is also recorded in the log book with great care to make sure that the notation with the proper check point markers is duly entered at the proper places on the sheet. Similar readings are taken at all of the smaller squares 16 in turn, with the radiation count per minute over a period of four consecutive minutes until all of the area 15 has been covered and all of the notations have been entered in the log book.

The radiation observer obtains a plane table map upon which all the sea level elevations have been placed for each and all of the check points, and proceeds to place in the radiation log book the elevations of each and all check points he has surveyed and recorded according to the check point of the corresponding numbers. The check point numbers of the plane table map, those of reference maps and the radiation log book should all have the identical numbers.

The radiation observer now subtracts the number of scintillations logged under each minute recorded under B. G. or background count from the number recorded immediately above, that is the M/H, the ground count. He then places a minus sign at each subtracted data where the background count is less than the ground count. However, in instances where the ground count is less than the background count he places a plus symbol at such data.

The radiation observer now subtracts the results of these figures from the sea level indicated at each respective check point station and records this result in the space at the right of these columns in the log book. The data figures resulting from these differences of scintillations above or below are the individual and collective datum used to contour the georadiograph map. At each and every check point on the map are printed the datum figures indicated from the log book, and these figures, marked "above" or "below" sea level as the case may be, are the basis of all contouring. Contouring from the data figure is done in the same manner as all topographic maps and geological structure maps.

In interpreting the georadiograph map, contours, contour symbols, faults, and so forth are read in precisely the same manner as all geological subsurface maps. The data presented however represents the actual exactness of measurements of the varying quantity of received neutrons and/or beta, gamma rays and radon gas and/or protons caused by two principal factors, that is: first, the effects of the blocking and/or absorption or thermalizing of certain elements in the earth's stratosphere; second, the effects of the varying thickness of formation deposits and so forth in the earth's stratosphere. These measurements never represent measurements of depth in feet as to certain or specific formations in the earth's stratosphere. They do however indicate in exact detail the precise locations of faults, and the exact locations and delineations of hydrocarbon in buried formations regardless of their geological structural position. This includes all radioactive elemental deposits as well as lead and/or other minerals economically important. Thus the features outlined by the georadiograph survey give accurately, in fact, not assumed, or projected in any manner, the structural delineations in every respect. "Closed" anomalies, however, in addition to the accurate location and delineation of structurally "closed" highs also accurately and specifically locate and/or delineate the area under which hydrocarbons, radioactive and/or metalliferous deposits occur. These deposits appear contoured as "closed highs". They are not "assumed" or "projected".

Having thus described the preferred embodiment of the invention it should be understood that numerous modifications and adaptations may be resorted to without departing from the spirit of the invention.

What is claimed is:

1. A prospecting system using georadiograph techniques comprising the steps of selecting an area to be surveyed, subdividing the area into a plurality of equal squares, placing an identifying check point number at each corner and also in the center of each of the squares, measuring with a geiger counter the background radiation at each check point from a point spaced above the ground with the geiger counter receiving tube closed, measuring with a geiger counter the ground level radiation at each check point with the geiger counter receiving tube open and pressed flat against the ground, subtracting the two measurements to determine if there has been a reduction in radiation as said radiation passed through the earth, and using these subtracted radiation figures to plot a contour georadiograph map of the area.

2. The system of claim 1 wherein a reduction in radiation as it passes through the earth indicates an absorption of radiation by a deposit of hydrocarbon located below the surface of the earth.

* * * * *